(12) United States Patent
Kudoh et al.

(10) Patent No.: US 7,477,253 B2
(45) Date of Patent: Jan. 13, 2009

(54) STORAGE MEDIUM STORING ANIMATION IMAGE GENERATING PROGRAM

(75) Inventors: Hirokazu Kudoh, Tokyo (JP); Kazunori Nakamura, Tokyo (JP); Shigeo Morishima, Tokyo (JP)

(73) Assignee: Sega Corporation, Tokyo (JP)

( * ) Notice: Subject to any disclaimer, the term of this patent is extended or adjusted under 35 U.S.C. 154(b) by 268 days.

(21) Appl. No.: 10/441,194

(22) Filed: May 20, 2003

(65) Prior Publication Data

US 2004/0085320 A1  May 6, 2004

(30) Foreign Application Priority Data

May 28, 2002  (JP)  ............... 2002-153887

(51) Int. Cl.
G06T 17/00 (2006.01)
G06T 15/00 (2006.01)

(52) U.S. Cl. .................. 345/473; 345/473; 345/474; 345/475; 345/956; 345/957

(58) Field of Classification Search ................. 345/475
See application file for complete search history.

(56) References Cited

U.S. PATENT DOCUMENTS

| | | | | |
|---|---|---|---|---|
| 4,600,919 | A * | 7/1986 | Stern | 345/473 |
| 5,923,337 | A * | 7/1999 | Yamamoto | 345/473 |
| 5,999,194 | A * | 12/1999 | Brunelle | 345/473 |
| 6,232,965 | B1 * | 5/2001 | Scott et al. | 715/500.1 |
| 6,504,541 | B1 * | 1/2003 | Liu et al. | 345/619 |
| 6,532,011 | B1 * | 3/2003 | Francini et al. | 345/420 |
| 6,664,956 | B1 * | 12/2003 | Erdem | 345/419 |
| 6,734,851 | B2 * | 5/2004 | Georgiev | 345/473 |
| 2002/0041285 | A1 * | 4/2002 | Hunter et al. | 345/474 |
| 2003/0043153 | A1 * | 3/2003 | Buddemeier et al. | 345/473 |

(Continued)

FOREIGN PATENT DOCUMENTS

JP  08-297751  11/1996

(Continued)

OTHER PUBLICATIONS

Jun-yong Noh & Ulrich Neumann (2001). Expression cloning. ACM SIGGRAPH 2001, p. 277-288.*

(Continued)

Primary Examiner—Kee M Tung
Assistant Examiner—Daniel F Hajnik
(74) Attorney, Agent, or Firm—Dickstein Shapiro LLP (57) ABSTRACT

An animation image generating program is provided which allows animation images to be readily generated by CG without complicated setups, and more particularly the animation image generating program is suited to generate a plurality of types of face animation images by CG. The animation image generating program includes the steps of controlling selection of specific vertices of a standard model and a user model, providing control such that first target vertices are associated with second target vertices where the first target vertices are the selected specific vertices of the standard model and the second target vertices are the selected specific vertices of the user model, providing control by arithmetic means such that coordinates of the first target vertices approximate to those of the second target vertices, to generate fitting information, and animating the user model based on animation data of the standard model and on the fitting information.

3 Claims, 12 Drawing Sheets

U.S. PATENT DOCUMENTS

2003/0164829 A1* 9/2003 Bregler et al. ............... 345/474
2003/0234788 A1* 12/2003 Uesaki et al. ............... 345/473

FOREIGN PATENT DOCUMENTS

| | | |
|---|---|---|
| JP | 11-66345 | 3/1999 |
| JP | 11-149565 | 6/1999 |

OTHER PUBLICATIONS

James Kent, Wayne Carlson, & Richard Parent (1992). Shape transformation for polyhedral objects. Computer Graphics 26(2), Jul. 1992, p. 47-54.*

Frederic Parke & Keith Waters. Computer facial animation (1996). A.K. Peters. Wellesley, MA.*

Chris Bregler & Lorie Loeb (2001). Stealing from the Masters: Motion capturing cartoons. Included in provisional application 60277889 files on Mar. 21, 2001. Eventually published in ACM Transactions on Graphics, Jul. 2002.*

Frederic Pighin, Jamie Hecker, Dani Lischinski, Richard Szeliski, and David H. Salesin- "Sythesizing Realistic Facial Expressions from Photographs", International Conference of CG of Interactive Tech., Proceedings of the 25th annual conf on CG and interactive techniques, pp. 75-84, Pub 1998.*

* cited by examiner

INITIAL POSITION OF THE INTERNAL POINT P

FINAL POSITION OF THE INTERNAL POINT P OBTAINED AFTER 30 TIMES (THREE TIMES X 10) OF AFFINE TRANSFORMATION.

SECOND AFFINE TRANSFORMATION

FIG. 7B

REPETITION OF THESE PROCESSES 10 TIMES CAUSES THE TRIANGLE A TO BE DEFORMED INTO THE TRIANGLE B. THE INTERNAL POINT MOVES ACCORDINGLY.

THIRD AFFINE TRANSFORMATION

STORAGE MEDIUM STORING ANIMATION IMAGE GENERATING PROGRAM

BACKGROUND OF THE INVENTION

1. Field of the Invention

The present invention relates particularly to an animation image generating program suited for face animations depicting mouth movements which correspond to speeches.

2. Description of the Related Art

Recent years have seen creation of three-dimensional (3D) animation images and display of their pictures using computer graphics (CG) techniques.

In such a field, moving pictures are displayed which depict mouth movements and facial expressions corresponding to characters' moment-by-moment speeches and emotions as a form of animation. Until today, such moving pictures have been created by creating an animation pattern image of facial model for each frame of characters' movements, that is, by moving the vertices of the facial model or moving the "bones" incorporated into the model.

Thus, an animation pattern image of the facial model has been created for each picture frame to create face animations depicting speeches and facial expressions in CG. These images have been arranged along the time-axis and reproduced continuously.

Therefore, images of all facial expression shapes and all mouth shapes during speeches are created prior to animation generating tasks to create face animations of a certain character model. The images are further combined to create the whole.

Moreover, shape data of a certain model A cannot be used for the facial shape of other character model B. Therefore, similar image data must be created for all characters, resulting in enormous costs and amounts of time needed for creation.

A technique using an "artificial joint mechanism" called the skeleton has been traditionally employed for deforming certain three-dimensional computer graphics (3DCG). However, creation of speeches or expressions with the skeleton is difficult since face does not move with joints as arms and legs do.

The prior art called the Wrap Deformation allows changes made to a certain model shape A to be reflected in other model shape B. An example of calculations by the Wrap Deformation is as shown below.

Assuming that both the models A and B have six vertices each,

Model A's vertex 1 (X coordinate)=$w_1$x model B's vertex 1 (X coordinate)+$w_2$x model B's vertex 2 (X coordinate)+$w_3$x model B's vertex 3 (X coordinate)+$w_4$x model B's vertex 4 (X coordinate)+$w_5$X model B's vertex 5 (X coordinate)+$w_6$x model B's vertex 6 (X coordinate)

Model A's vertex 1 (Y coordinate)=Same as above

Model A's vertex 1 (Z coordinate)=Same as above where $w_n$ (n=1 to 6) is a weight coefficient assigned from each of the vertice sof the model B to a specific vertex of the model A.

As is apparent from the above calculation example, there are not many calculations involved when models have only a small number of vertices (10 or so), thus allowing the PC to perform calculation operations without laboring. However, an enormous amount of calculations is required if the number of vertices amounts to 1,000 to over 100,000 as in the case of facial models used in ordinary 3DCG, thus making it almost impossible to obtain realistic results with PCs available today.

SUMMARY OF THE INVENTION

In the light of a large amount of work handled by animation creators and a large amount of calculations needed in using such traditional animation generating methods, it is an object of the present invention to provide an animation image generating program which allows animation images to be readily generated by CG without complicated setups, and more particularly an animation image generating program suited to generate a plurality of types of face animation images by CG.

It is another object of the present invention to provide a program which allows generation of animation images by CG whose calculations can be readily performed by PCs.

In order to achieve the above objects, according to a first aspect of the present invention there is provided a storage medium storing an animation image generating program which is run under the control of a computer system, the animation image generating program including the steps of controlling selection of specific vertices of a standard model and a user model; providing control such that first target vertices are associated with second target vertices where the first target vertices are the selected specific vertices of the standard model and the second target vertices are the selected specific vertices of the user model; providing control by arithmetic means such that coordinates of the first target vertices approximate to those of the second target vertices, to generate fitting information; and animating the user model based on animation data of the standard model and on the fitting information.

A second aspect of the animation image generating program may further include in the first aspect, the step of controlling the vertices of the standard model based on the fitting information such that the shape of the standard model approximates to that of the user model.

A third aspect of the animation image generating program may further include in the first or second aspect, the step of defining deformations corresponding to text or voice data inputs in the fitting information.

A forth aspect of the animation image generating program may perform the approximation of the vertices by using affine transformation.

A fifth aspect of the animation image generating program may perform in the forth aspect, the affine transformation on a plurality of occasions.

In order to achieve the above objects, according to a sixth aspect of the present invention there is provided a storage medium storing an animation image generating program which is run under the control of a computer system, the animation image generating program including the steps of controlling readout of a wire frame having target points on a face image of a standard model acting as a reference and readout of a face image of a user model, controlling a CPU such that coordinates are specified in the face image of the user model by the wire frame set up by the user; allowing the CPU to perform affine transformation of the coordinates of the target points of the standard model into target coordinates of the face image of the user model specified by the wire frame, to generate fitting information, and animating the user model based on the fitting information and the standard model animation data.

A seventh aspect of the animation image generating program may perform in the sixth aspect, the affine transformation of the coordinates of the target points of the standard model into target coordinates of the face image of the user model is performed on a plurality of occasions.

A eighth aspect of the animation image generating program may further include in the sixth aspect, the step of casting a ray from a vertex of the face image of the standard model subjected to the affine transformation to the user model such that a projection point at the intersection between the ray and the user model is used as a new vertex to correct a triangle of the standard model.

A ninth aspect of the animation image generating program may further include in the sixth aspect the step of defining mouth movements (deformations) corresponding to text or voice inputs in the fitting information.

A tenth aspect of the animation image generating program may further include as the step of defining mouth movements of the ninth aspect, the steps of casting a ray from the user model to the standard model to use as a projection point, the intersection between the ray and the standard model, for definitions of the deformations; calculating a motion vector from the product of an affine transformation matrix and the projection point, the affine transformation matrix being obtained from vertices of the triangle prior and posterior to deformations corresponding to the text or voice input, of the standard model including the projection point, and controlling the CPU such that the motion vector is added to the vertex of the user model corresponding to the target projection point to deform the user model.

In order to achieve the above objects, according to an eleventh aspect of the present invention there is provided a storage medium storing an animation image generating program which is run under the control of a computer system, the animation image generating program including the steps of controlling selection of coordinates of specific positions of a standard model and a user model, providing control such that first target points are associated with second target points where coordinates of the first target points are those of the selected specific positions of the standard model and coordinates of the second target points are those of the selected specific positions of the user model, providing control by arithmetic means such that the coordinates of the first target points approximate to those of the second target points, to generate fitting information, and animating the user model based on animation data of the standard model and on the fitting information.

DETAILED DESCRIPTION OF THE PREFERRED EMBODIMENTS

Features of the present invention will become more apparent from the following embodiments of the invention which will be described with reference to the accompanying drawings.

Figure 1:
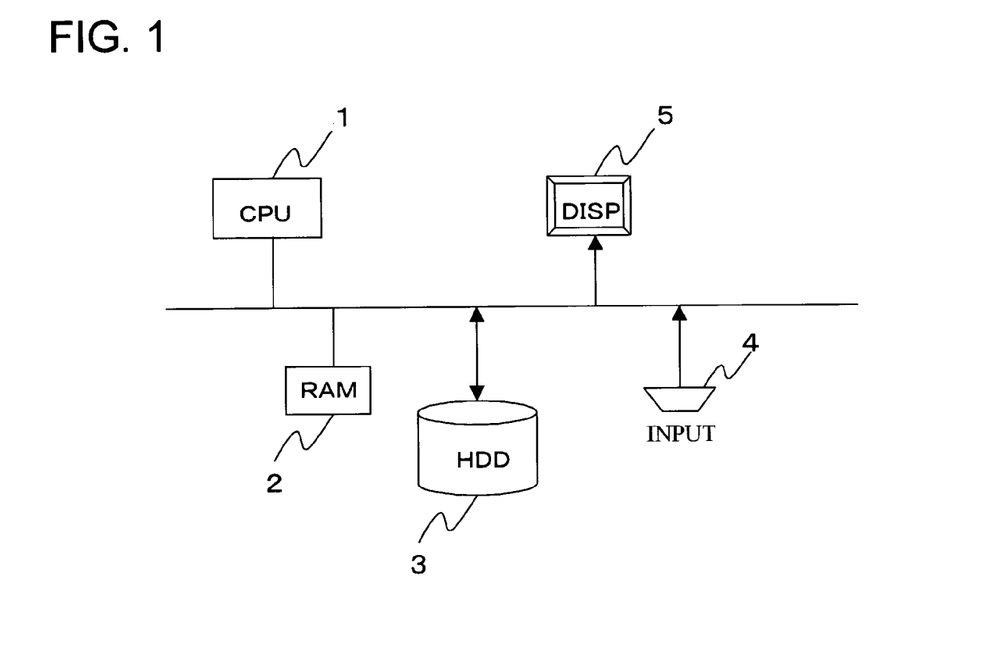
FIG. 1 is a block diagram showing an example of configuration of an ordinary PC system which runs a face animation image generating program of the present invention.

FIG. 1 is a block diagram showing an example of configuration of an ordinary PC system which runs an animation image generating program of the present invention.

While face animations depicting facial movements corresponding to speeches are taken as an example of animation images in the embodiments described below, the present invention is not limited to such an application.

A PC configured as shown in FIG. 1 has a CPU 1 designed to perform arithmetic operations on data of the face animation image generating program which is an application example of the present invention, a work main memory 2 and an auxiliary storage device 3 which includes a hard disk storing the face animation image generating program.

Further, the PC is connected to an input device 4 such as keyboard which allows the CG creator to enter commands and other information and a display device 5 including display monitor and speaker which displays images and produces voices during and at the completion of CG creation.

A face animation image program associated with a standard model has been created and stored in the auxiliary storage device 3 as part of the face animation image generating program which is an application example of the present invention.

The standard model provides animations depicting mouth movements which correspond to predetermined speeches and a plurality of animation generating algorithms depicting facial expression changes which correspond to emotions. Animation image generating methods using the standard model include, for example, that which is mentioned in "Bill Fleming and Darris Dobbs: Animating Facial Features and Expressions", and animation images can be generated using the standard model when commercially available program products such as Maya: Alias Wavefront, a division of Silicon Graphics Limited. products, SoftImage: Avid Technoligy, Inc. products and 3D Studio: Discreet, a division of Autodesk, Ink. products are used.

Further, the auxiliary storage device 3 stores wire frame data, which allows specific facial positions to be specified, as part of the face animation image generating program.

Further, the CG creator needs to create face images which correspond to character models appearing in the animation and make such image data ready for use.

The step of generating face animation images using the face animation image generating program of the present invention will then be described based on the premises described above.

Figure 2:
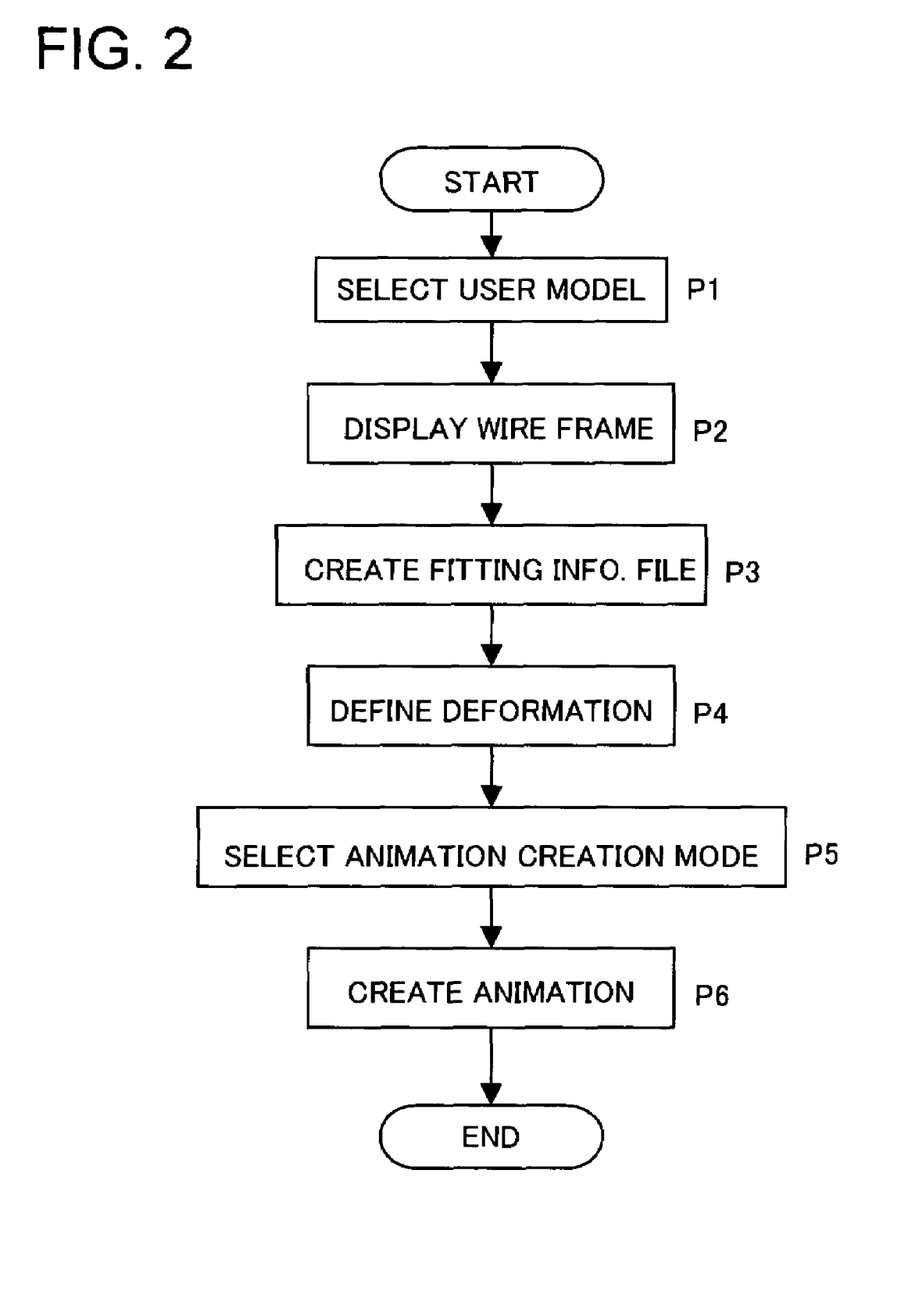
FIG. 2 is a flowchart showing an embodiment of the step of generating face animation images by the face animation image generating program of the present invention.

FIG. 2 is a flowchart showing the step of generating face animation images by the face animation image generating program in one embodiment. Such a step in the flowchart are performed by controlling the CPU 1 by the face animation image generating program stored on the auxiliary storage device 3.

In FIG. 2, the CG creator selects one of the user models from the input device 4 (process P1). Then the CG creator gives an instruction that a wire frame be displayed (process P2).

The CG creator creates a fitting information file using the displayed wire frame (process P3).

Fitting in this case refers to transforming coordinates of a standard model A into those of a selected user model B.

Figure 3:
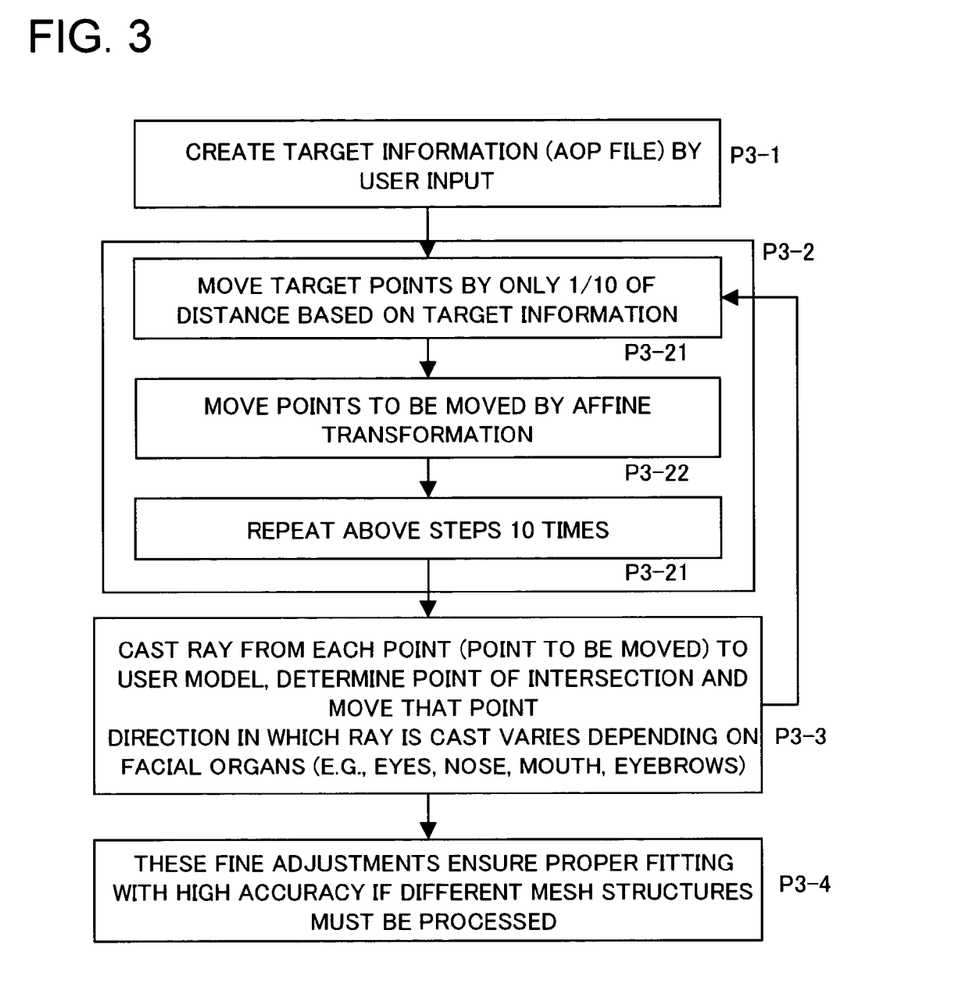
FIG. 3 is a detailed flowchart for creating a fitting information file.

FIG. 3 is a detailed flowchart for creating a fitting information file. The CG creator creates target information first before creating fitting information (process step P3-1).

Figure 4A:
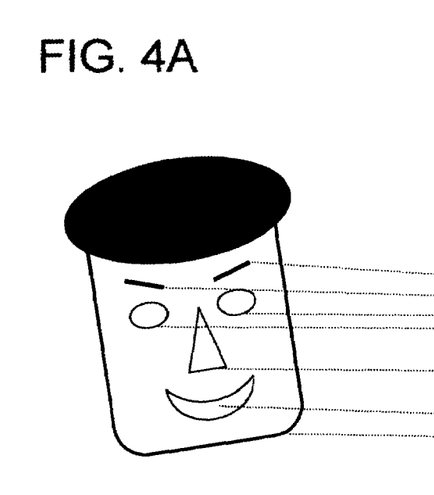
FIGS. 4A and 4B are diagrams explaining creation of the fitting information file.
Figure 4B:
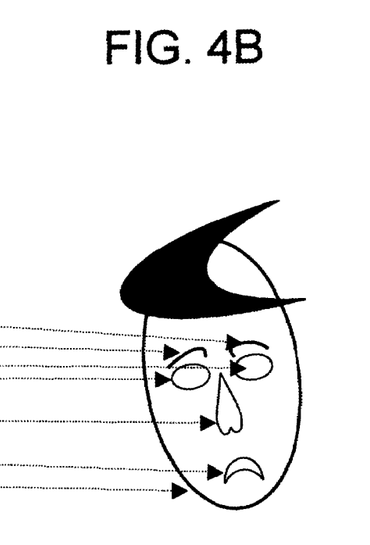

Specific positions (target points) of the standard model A such as facial profile, eyebrows, eyes, nose and mouth are associated with the corresponding areas of the user model B's image as shown in FIGS. 4A and 4B.

Figure 5:
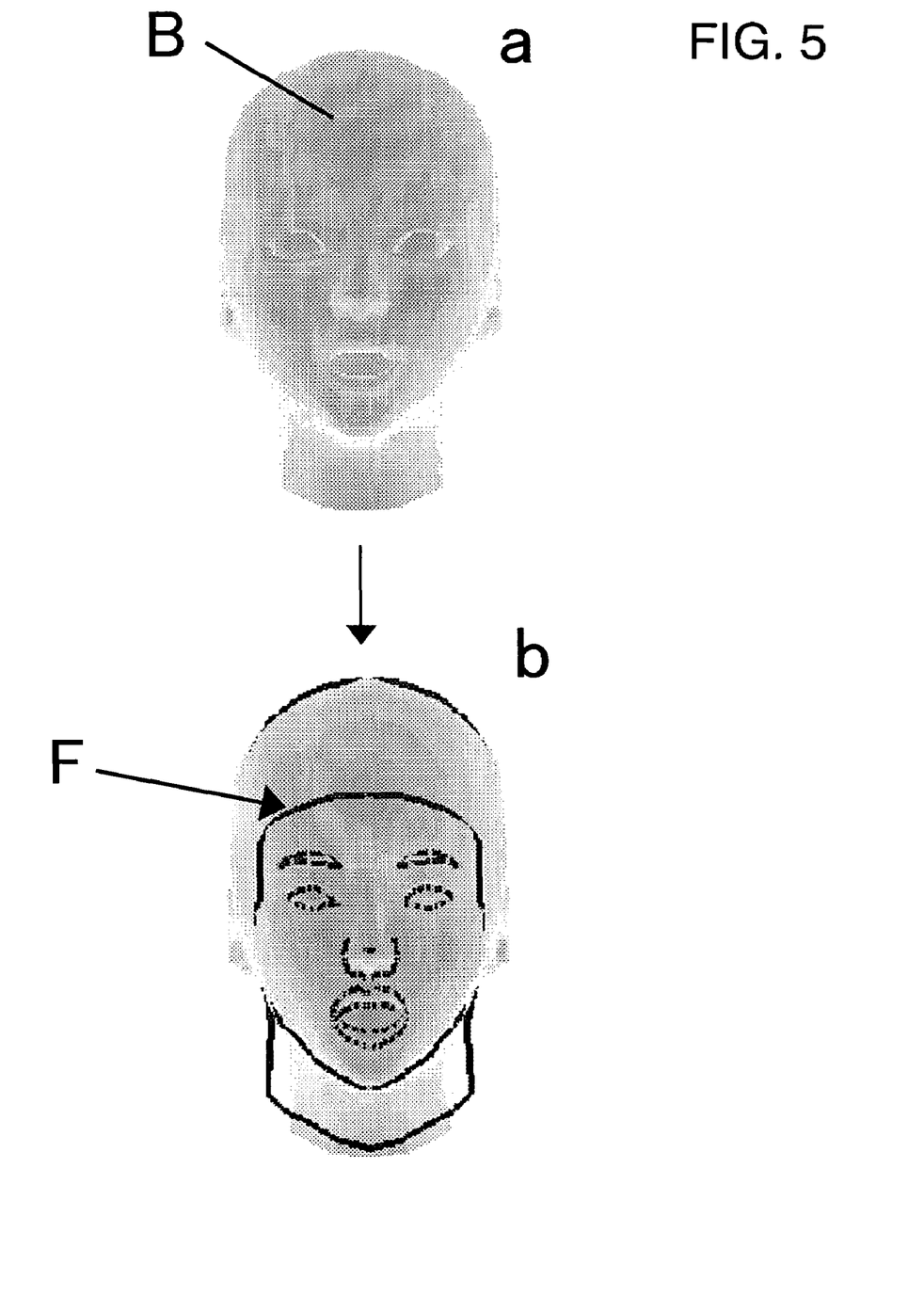
FIG. 5 is a diagram showing a wire frame F, which represents specific positions (target points) of a standard model A, fitted onto a user model B.

FIG. 5 is a diagram showing a wire frame F, which represents specific positions (target points) of the standard model A, not shown in FIG. 5, fitted onto the user model B. The CG creator obtains a target information file (aop: auto-fitting outline position) by deforming the wire frame F which represents specific positions (target positions) of the standard model A such that the wire frame F is overlaid on the user model B shown in FIG. 5a and mapping specific positions of the standard model A to those of the user model B's image as shown in FIG. 5b.

Next, the CG creator uses affine transformation to transform coordinates of the standard model A into target coordinates of the user model B identified by the target information file (process step P3-2). The distances between the coordinates of the standard model A and the target coordinates of the user model B are divided into 10 parts in one embodiment and transformed gradually over 10 steps through affine transformation (process steps P3-21 to P3-23). Such an arrangement prevents errors arising from large deformation.

Figure 6:
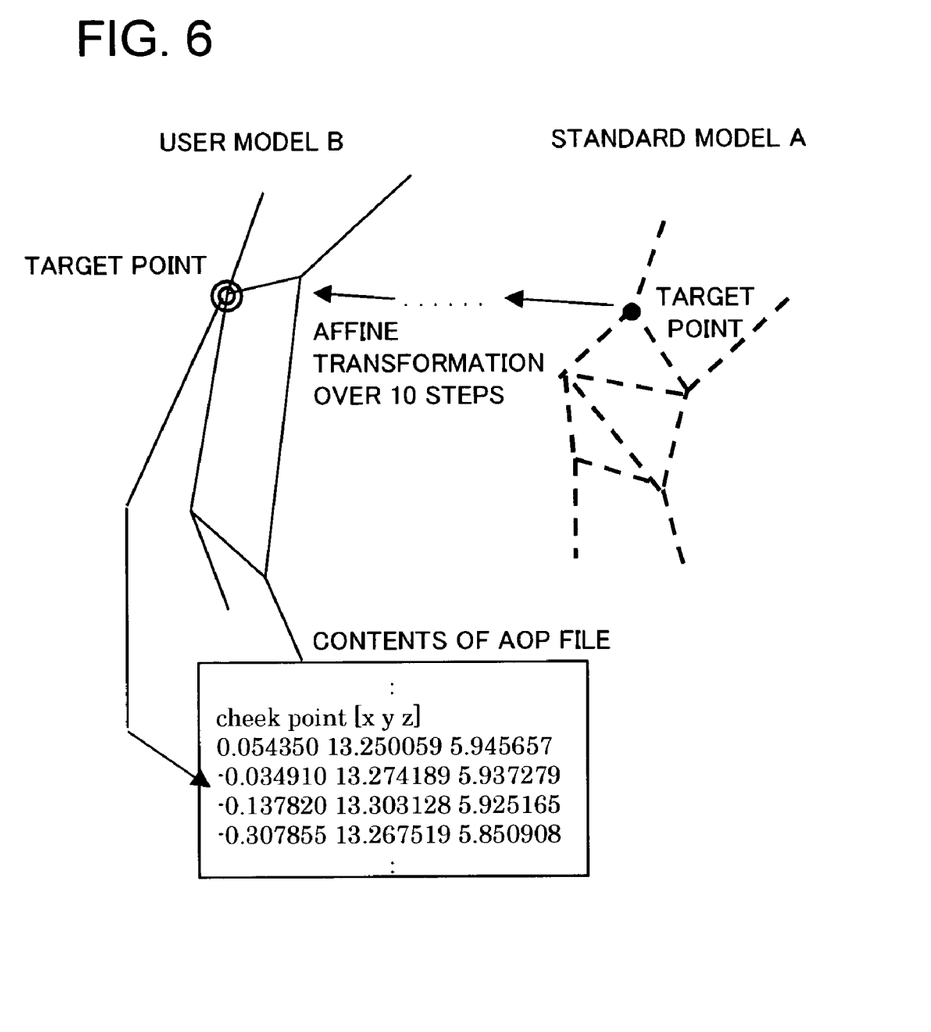
FIG. 6 is a diagram showing affine transformation performed gradually.

FIG. 6 is a diagram showing affine transformation performed gradually. A plurality of target points of the standard model A, identified by the wire frame F, are gradually brought closer to the target points of the user model B through affine transformation over 10 steps such that the target points of the standard model A are associated with those of the user model B.

The contents of the aop file shown in FIG. 6 represent three-dimensional coordinates of a plurality of target points of the user model B. The coordinates correspond to those of the target points identified by the wire frame F as described earlier.

Figure 7A:
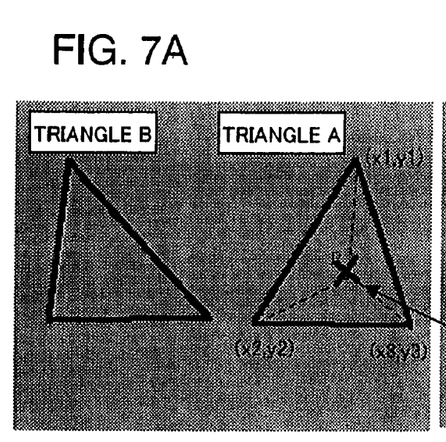
FIGS. 7A to 7D are explanatory diagrams of affine transformation.

Affine transformation is described with reference to FIGS. 7A through 7D. Affine transformation of a triangle A (corresponding to the standard model) into a triangle B (corresponding to the user model) is considered in FIGS. 7A through 7D. The triangle A has three sets of vertex coordinates or (x1, y1), (x2, y2) and (x3, y3). An internal point P is identified by the coordinates of the three vertices. The triangle B has three sets of vertex coordinates or (x1B, y1B), (x2B, y2B) and (x3B, y3B) as shown in FIG. 7A.

Figure 7B:
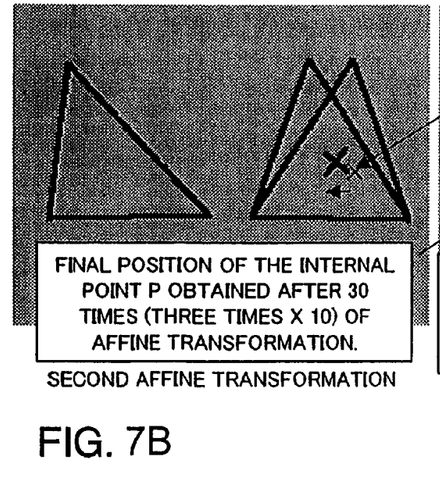
Figure 7C:
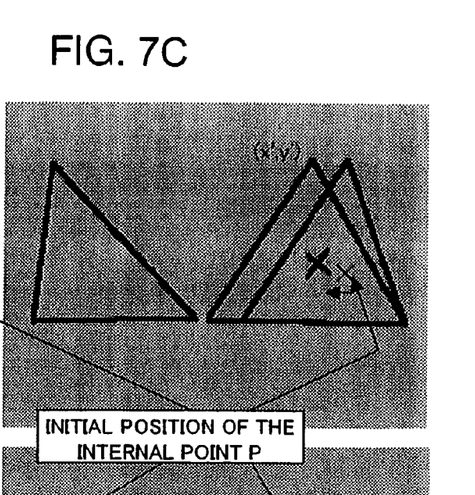
Figure 7D:
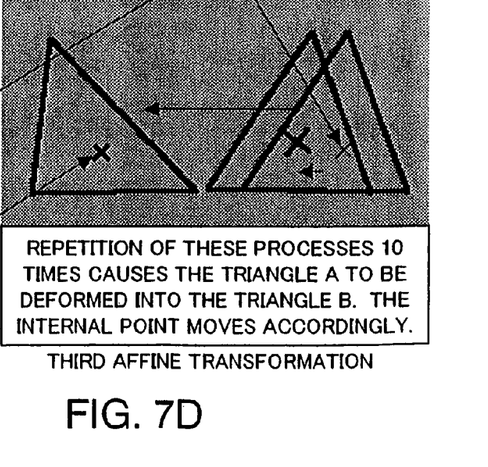

First, one of the vertices (x1, y1) of the triangle A is moved to a point (x1', y1') which is located at 1/10th of the distance to the vertex (x1B, y1B) of the triangle B as shown in FIG. 7B, then the second vertex (x2, y1) is similarly moved to a point (x2', y2') as shown in FIG. 7C, and further the third vertex (x3, y3) is moved to a point (x3', y3') as shown in FIG. 7D.

Repetition of this step 10 times moves the triangle A to the triangle B. Accordingly, the internal point P moves into the triangle B as shown in FIG. 7D after affine transformation is performed a total of 30 times.

Affine transformation in this case is expressed by the following formulas:

Writing the three points on the same plane in matrix form, we obtain $$\begin{vmatrix} x1 & x2 & x3 \\ y1 & y2 & y3 \\ 1.0 & 1.0 & 1.0 \end{vmatrix}$$

Writing the points, to which the three points were moved by an affine transformation matrix T, in matrix form, we obtain $$\begin{vmatrix} x' & x2 & x3 \\ y' & y2 & y3 \\ 1.0 & 1.0 & 1.0 \end{vmatrix}$$

The three points are on the same plane.
Hence, $$T * \begin{vmatrix} x1 & x2 & x3 \\ y1 & y2 & y3 \\ 1.0 & 1.0 & 1.0 \end{vmatrix} = \begin{vmatrix} x' & x2 & x3 \\ y' & y2 & y3 \\ 1.0 & 1.0 & 1.0 \end{vmatrix}$$

Therefore, the affine transformation matrix T is $$T = \begin{vmatrix} x' & x2 & x3 \\ y' & y2 & y3 \\ 1.0 & 1.0 & 1.0 \end{vmatrix} * \begin{vmatrix} x1 & x2 & x3 \\ y1 & y2 & y3 \\ 1.0 & 1.0 & 1.0 \end{vmatrix}^{-1}$$

where $|X|^{-1}$ represents the inverse matrix of a matrix X.

Fine adjustments are made in FIG. 3 to ensure fitting accuracy (process steps P3-3 and P3-4). The adjustments are necessary to depict individual organs of a facial model (e.g., eyes, nose, mouth, eyebrows) in detail.

Figure 8A:
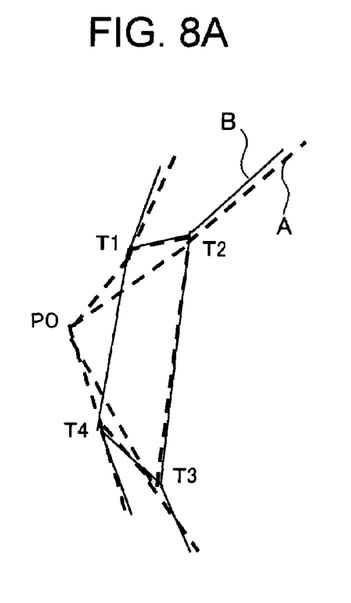
FIGS. 8A and 8B are explanatory diagrams of fine adjustments for fitting.
Figure 8B:
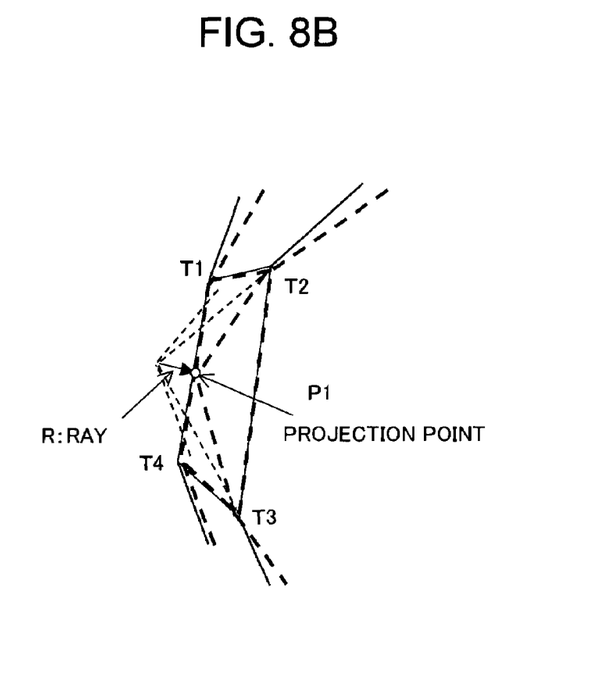

FIGS. 8A and 8B are explanatory diagrams of the adjustments. FIG. 8A illustrates the standard model A fitted onto the user model B by affine transformation described earlier. Corresponding target points of the standard model A are fitted onto target coordinates T1 to T4 of the user model B.

A target point P0 of the standard model A protrudes from the user model B. Therefore, further fine adjustments are required.

FIG. 8B is a diagram explaining how fine adjustments are made to the protruding vertex P0. In FIG. 8B, a ray is cast perpendicularly from the protruding vertex P0 of the standard model A to the user model B, letting the point of intersection between the end of the ray and the user model B be a projection point P1 (process step P3-3). This causes a triangle formed by the vertex P0 and the vertices T1 to T4 to be deformed into a triangle formed by the vertex P1 and the vertices T1 to T4, making the standard model A approximate to the user model B (process step P3-4).

These processings make it possible to provide the user model B with movements similar to those of animations of the standard model A as the animations move.

Figure 9A:
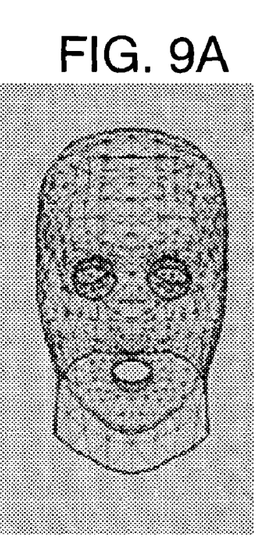
FIGS. 9A and 9B illustrate frame images of the standard model A and the user model B prior to fitting.
Figure 9B:
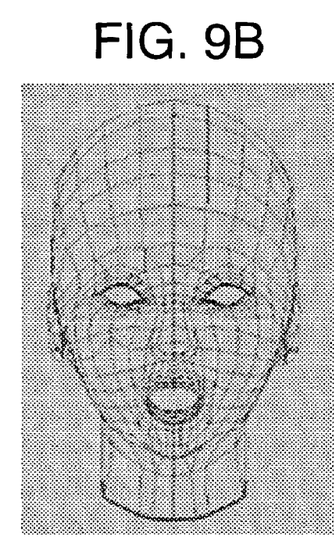
Figure 10A:
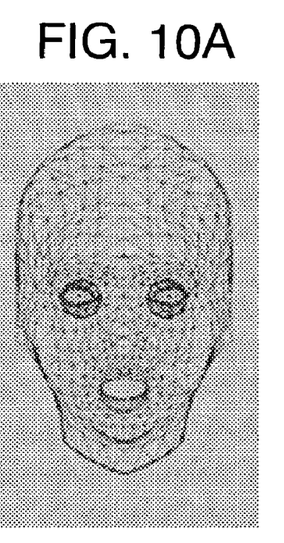
FIGS. 10A and 10B illustrate frame images of the standard model A and the user model B posterior to fitting.
Figure 10B:
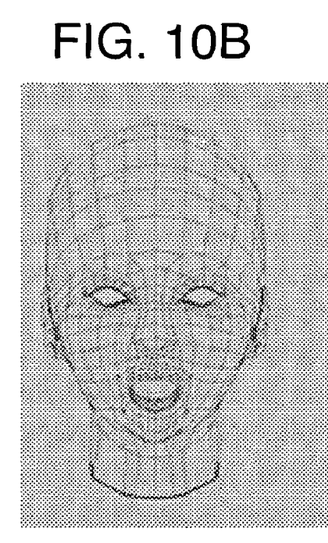

FIGS. 9A and 9B illustrate frame images of the standard model A and the user model B before fitting. FIGS. 10A and 10B illustrate frame images of the standard model A and the user model B after fitting. A comparison of the figures makes it apparent that the frame image of the standard model A in FIG. 10A approximates to that of the user model B in FIG. 9B.

Figure 11:
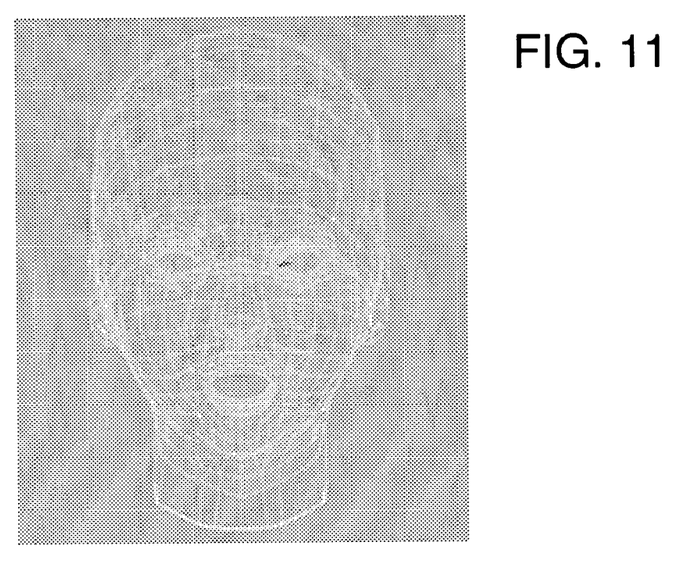
FIG. 11 illustrates a three-dimensional image fitted onto the fitted user model B.
Figure 12:
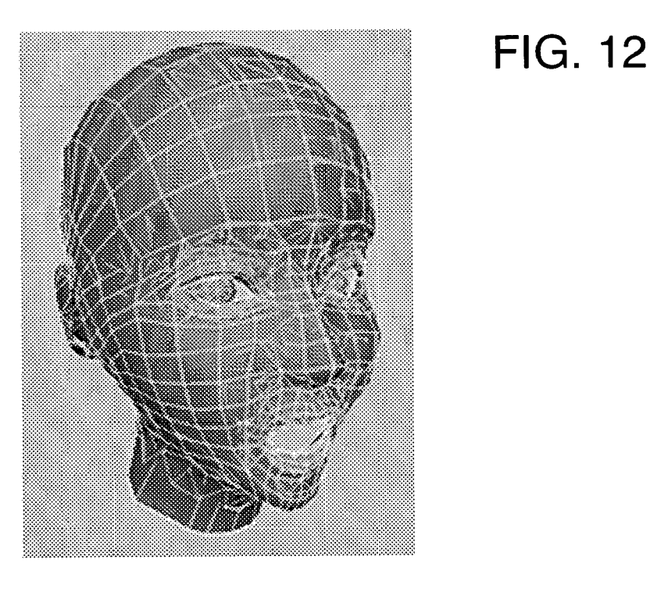
FIG. 12 is a perspective view of the three-dimensional image of the user model B in FIG. 11 after rotation of the image.

FIG. 11 illustrates a three-dimensional image after the standard model A has been fitted onto the user model B while the FIG. 12 illustrates a perspective view of the three-dimensional image of the user model B in FIG. 11 after rotation of the image.

As described above, use of the data obtained by fitting the standard model A onto the user model B and the animation image generating program of the standard model A allows animation images of the user model B to be readily obtained.

Further, fitting of the user model A onto a plurality of the user models B in the same manner allows animation images of a plurality of the user models to be readily generated.

Next, it is important to provide text or voice inputs by the operator with animations of the models' mouth movements corresponding to such inputs. For this reason, a processing is performed as shown in FIG. 2 which gives the user models definitions of deformation which correspond to speeches (process P4).

Figure 13:
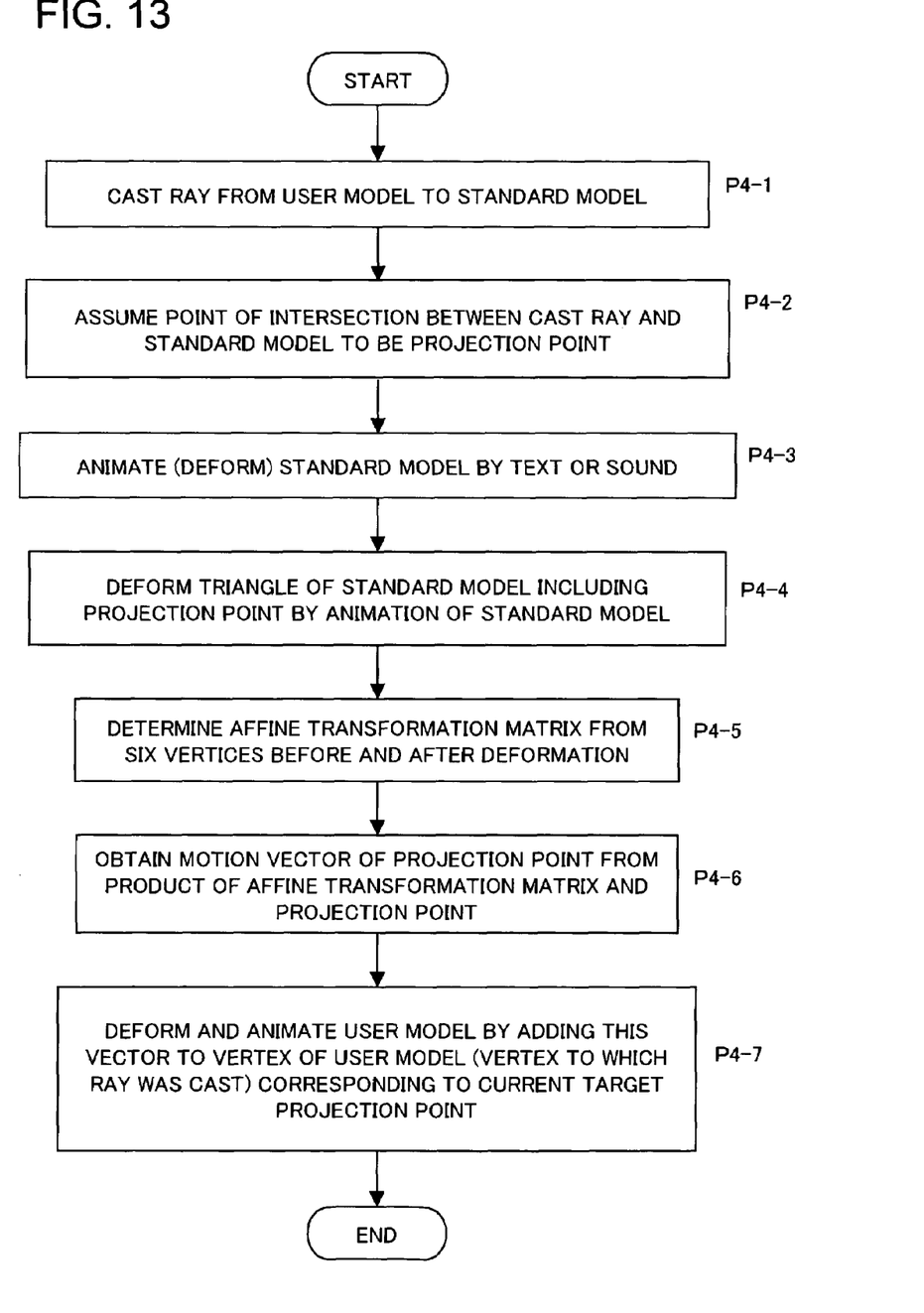
FIG. 13 is a detailed operational flowchart of processing (process P4) which gives definitions of deformation.
Figure 14A:
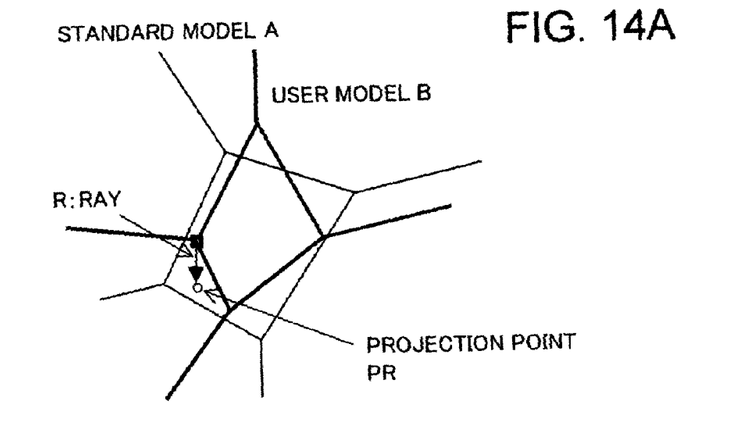
FIGS. 14A-14C are explanatory diagrams corresponding to the operational flow of the processing (process P4) which gives definitions of deformation.
Figure 14B:
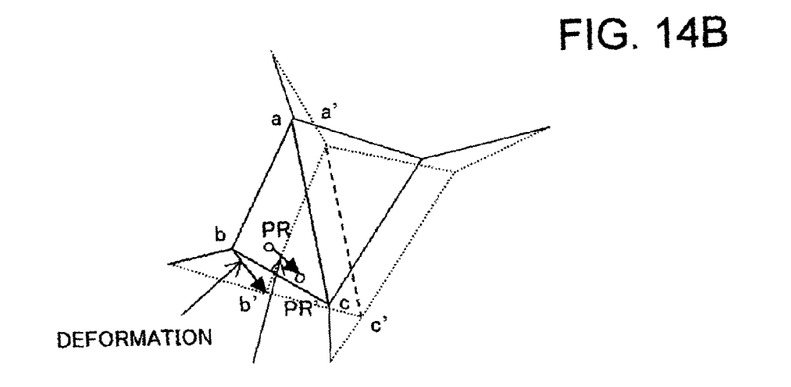
Figure 14C:
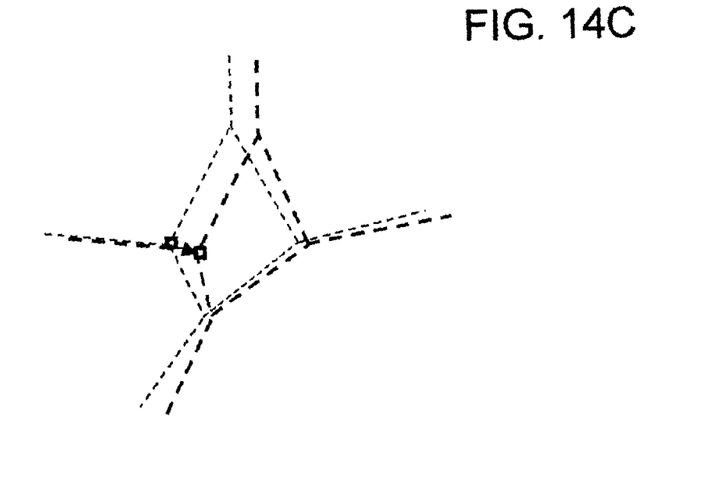

FIG. 13 is a detailed flowchart of processing (process P4) which gives definitions of deformation. FIGS. 14A-14C illustrate explanatory diagrams corresponding to the operational flow.

In FIG. 13, a ray is cast from the user model B to the standard model A as shown in FIG. 14A (process step P4-1). The point of intersection between the cast ray and the standard model is assumed to be a projection point PR (process step P4-2).

The face of the standard model A is animated (deformed) by text or voices (process step P4-3). Animation of the standard model A causes the triangle of the standard model (triangle having vertices a, b and c in FIG. 14B) including the projection point PR to be deformed (process step P4-4).

An affine transformation matrix can be found from vertices a', b' and c' of the triangle after deformation and the vertices a, b and c of the triangle before deformation. A motion vector (PR→PR') of the projection point can be found from the product of the affine transformation matrix and the projection point (process step P4-6).

The motion vector is added to the vertex of the user model (vertex to which the ray was cast) corresponding to the current target projection point PR, thus causing the user model to be deformed as shown in FIG. 14C to generate an animation (process step P4-7).

Referring back to FIG. 2, emotions of the user models during speeches are added as parameters to speech data of the animation algorithms thus generated (process P5).

Deformations manifest themselves in the form of facial expressions corresponding to angers, sorrows, laughs and other emotions of the user models during speeches. Therefore, a plurality of parameters corresponding to emotions of the user models are made available in advance as animation creation modes. The parameters are selected for the user models generated as described above in accordance with the mode (process P5).

Running the animation generating program of the standard model based on the user models thus obtained allows animation images to be readily generated for an arbitrary user model.

As has been discussed in the above embodiments with reference to the drawings, the invention enables a plurality of animation images to be readily obtained from the animation generating algorithms of the standard model. Further, the present invention enables animation images to be generated in the same manner for a plurality of different user models.

What is claimed is:

1. A machine implemented method of displaying an animation image of a user model using fitting information, said method comprising preparing an animation program which when executed, causes a processor to perform displaying an animation image of a standard model;

fitting the standard model to a user model by affine-transformation of three-dimensional coordinates at first target vertices of the standard model to three-dimensional coordinates at corresponding second target vertices of the user model to generate fitting information; and executing the animation program prepared for the standard model, by using data of the standard model fitted to the user model based on the generated fitting information to display on a display device an animation image of the user model, the step of fitting the standard model to the user model including:

specifying pairs of the first target vertices of the standard model and second target vertices of the user model;

dividing a distance between the first and second target vertices of each of the specified pairs into a predetermined number of divided distances;

gradually bringing coordinates of the first target vertices of the standard model closer to coordinates of the second target vertices of the user model by affine transformation of each of said divided distances individually;

casting a ray from a protruding vertex having a normal vector, of the standard model to the user model in the direction of the normal vector to set an intersection of the ray and the user model as a new vertex of the standard model; and generating fitting information based on the first target vertices, of the standard model, brought closer to the specified second target vertices of the user model, including the new vertex of the standard model.

2. The method of displaying an animation image of a user model according to claim 1, wherein the step of generating the fitting information further includes defining deformations in the fitting information corresponding to text or voice data inputs.

3. The method of displaying an animation image of a user model according to claim 1, wherein the second target vertices of the user model are specified by a wire frame having the first target vertices.

* * * * *